(12) United States Patent
Tomida

(10) Patent No.: US 8,219,685 B2
(45) Date of Patent: Jul. 10, 2012

(54) THIN CLIENT APPARATUS, A CONTROL METHOD THEREOF, AND A PROGRAM STORAGE MEDIUM FOR A THIN CLIENT SYSTEM FOR INTERGRATING INPUT INFORMATION ITEMS AND TRANSMITTING THE INTERGRATED INFORMATION TO A SERVER

(75) Inventor: Takahiro Tomida, Hamura (JP)

(73) Assignee: Casio Computer Co., Ltd, Tokyo (JP)

( * ) Notice: Subject to any disclaimer, the term of this patent is extended or adjusted under 35 U.S.C. 154(b) by 395 days.

(21) Appl. No.: 11/861,553

(22) Filed: Sep. 26, 2007

(65) Prior Publication Data
US 2008/0077660 A1 Mar. 27, 2008

(30) Foreign Application Priority Data
Sep. 26, 2006 (JP) ................. 2006-260719

(51) Int. Cl.
*G06F 15/16* (2006.01)
(52) U.S. Cl. ........................ 709/227; 709/229
(58) Field of Classification Search .................. 709/203, 709/206, 227, 229; 345/158, 174, 177
See application file for complete search history.

(56) References Cited

U.S. PATENT DOCUMENTS

| 5,566,339 | A  | * | 10/1996 | Perholtz et al. ............... 713/340 |
| 5,896,495 | A  | * | 4/1999  | Stein et al. ...................... 714/38 |
| 6,877,007 | B1 | * | 4/2005  | Hentzel et al. ................ 709/224 |
| 6,990,489 | B2 | * | 1/2006  | Kondo et al. ........................ 1/1 |
| 7,026,929 | B1 | * | 4/2006  | Wallace .................. 340/539.13 |
| 7,287,273 | B2 | * | 10/2007 | Shoji et al. ......................... 726/7 |
| 7,421,741 | B2 | * | 9/2008  | Phillips et al. ................. 726/30 |
| 7,555,529 | B2 | * | 6/2009  | Bloomfield et al. .......... 709/217 |
| 7,624,135 | B2 | * | 11/2009 | Shoji et al. ........................... 1/1 |
| 2006/0030344 | A1 | * | 2/2006  | Lim .............. 455/512 |
| 2007/0065357 | A1 | * | 3/2007  | Chien ........................ 423/518 |
| 2007/0182595 | A1 | * | 8/2007  | Ghasabian ..................... 341/22 |

FOREIGN PATENT DOCUMENTS

| JP | 2002-328886 | 11/2002 |
| JP | 2003-323402 | 11/2003 |
| JP | 2004-349965 | 12/2004 |

OTHER PUBLICATIONS

Japanese Office Action for Application No. 2006-260719 mailed on Jun. 28, 2011.

\* cited by examiner

*Primary Examiner* — Kristie Shingles
(74) *Attorney, Agent, or Firm* — Turocy & Watson, LLP

(57) ABSTRACT

A client apparatus which transmits a service request to a server apparatus via a network and comprises an input event detector configured to detect input events, an information generator configured to generate an item of information integrating items of information of the input events detected by the input event detector, and a transmission unit configured to transmit the item of information to the server apparatus.

6 Claims, 8 Drawing Sheets

THIN CLIENT APPARATUS, A CONTROL METHOD THEREOF, AND A PROGRAM STORAGE MEDIUM FOR A THIN CLIENT SYSTEM FOR INTERGRATING INPUT INFORMATION ITEMS AND TRANSMITTING THE INTERGRATED INFORMATION TO A SERVER

CROSS-REFERENCE TO RELATED APPLICATIONS

This application is based upon and claims the benefit of priority from prior Japanese Patent Application No. 2006-260719, filed Sep. 26, 2006, the entire contents of which are incorporated herein by reference.

BACKGROUND OF THE INVENTION

1. Field of the Invention

The present invention relates to a server-based computing system in which a client apparatus, which makes a service request to a server apparatus, and the server apparatus, which executes an application program based on the service request, are interconnected via a network.

2. Description of the Related Art

In recent years, adoption of a server-based computing system by businesses is accelerated.

A server-based computing system (thin client system) is a system in which a client apparatus and a server apparatus are interconnected via a network. In the server-based computing system, when the client apparatus makes a service request to the server apparatus, the server apparatus manages data and executes an application program based on the service request from the client apparatus.

For example, Jpn. Pat. Appln. KOKAI Publication No. 2004-349965 discloses a technique used in the thin client system.

FIG. 1 is a view for schematically explaining a thin client system.

A user operates a client apparatus 1 (also called as a thin client terminal or a thin client apparatus) to utilize a service served by an application which is executed in a server apparatus 2. When the user operates a keyboard or a mouse of the client apparatus 1, the client apparatus 1 transmits input information according to the operation by the user to the server apparatus 2 via a network 3. The server apparatus 2 creates display data to be displayed by the client apparatus 1. The created display data is send to the client apparatus 1 via the network 3. The client apparatus 1 receives the display data created by the server apparatus 2 and displays the display data. The client apparatus 1 needs to merely include network equipment, a display device and an input device such as a mouse or a keyboard. The client apparatus 1 does not store data therein and therefore does not need storage such as a hard disk. The client apparatus 1 does not execute application program; accordingly processing load can be reduced.

In the server-based computing system, the server apparatus unifies the management of resources such as data and an application program. Therefore, an operational cost or a management cost can be saved. Moreover, as the client apparatus 1 employed is not a complicated and expensive personal computer but a low-cost terminal apparatus. The terminal apparatus includes minimal functions such as a display function and an input function. Accordingly, a procurement cost can be lowered in comparison with the personal computer.

Adoption of the server-based computing system improves information security. In the server-based computing system, the client apparatus 1 does not store data therein so that the leak of information can be effectively prevented. A risk due to an unauthorized access can be decreased by restricting the client apparatus 1 to access data stored in the server apparatus 2, or by logging an access to the server apparatus 2. The server apparatus 2 may centrally deal with overall computer viruses.

A problem of transmission delay may arise in data communication between the client apparatus 1 and the server apparatus 2 via the network 3. When the user operates the client apparatus 1, input information corresponding to the operation by the user is sent to the server apparatus 2 via the network 3. The server apparatus 2 receives the input information after a lapse of a delay time of the network 3 from the moment of the operation by the user.

For example, in a server-based computing system in which Japanese-language input is available, the server apparatus 2 executes kana-kanji conversion. Namely, the transmission delay reduces the conversion efficiency. To solve the problem, Jpn. Pat. Appln. KOKAI Publication No. 2003-323402 discloses the following technique. That is, the client apparatus 1 is provided with a pseudo environment (GUI emulator) of a graphical user interface (GUI) of the server apparatus 2, and the client apparatus 1 executes the kana-kanji conversion. The client apparatus 1 sends definite information (converted kanji) to the server apparatus 2, thus the problem of the transmission delay can be decreased.

However, when the network 3 is a mobile communication network, the transmission delay time may suddenly increase in the following cases, i.e., in the case of data retransmission when a transmission error occurs within a wireless zone, or in the case of zone switching performed when a terminal (client apparatus 1) is moving, for example. When the transmission delay time of the network 3 varies, the arrival of input information at the server apparatus 2 varies temporally. Therefore, the server apparatus 2 may perform an operation which the user does not intend.

FIGS. 2A and 2B are views showing communication packets transmitted when a user clicks a mouse button of the client apparatus 1. FIG. 3 is a view showing an example of a sudden fluctuation in the transmission delay time. The operation of mouse button clicking by the user includes a button press event of pressing the mouse button; and a button release event of releasing the mouse button. Information of the respective events is transmitted in separate packets (for example, transmission control protocol (TCP) packets) over the network 3.

When the user presses the mouse button of the client apparatus 1, the client apparatus 1 sends the first communication packet shown in FIG. 2A as input information to the server apparatus 2. The first communication packet contains a packet header and button press event information. When the user releases the mouse button, the client apparatus 1 sends the second communication packet shown in FIG. 2B to the server apparatus 2. The second communication packet contains a packet header and button release event information.

The information of click operation is divided into button press event information and button release event information. The divided two items of information are separately transmitted over the network 3 in the form of first and second communication packets. As shown in FIG. 3, when a sudden fluctuation in transmission delay time occurs between the reception of the first communication packet and the reception of the second communication packet, the transmission delay of the second communication packet (button release event) may become longer than the transmission delay of the first communication packet (button press event). Even though the period from a time when the user presses the mouse button to a time when the user releases the mouse button is short (click operation is performed), the server apparatus 2 may react as if the mouse button is pressed for a longer time. For example, in the case where the user clicks the scroll bar up or down button, even though the user intends to scroll slightly, the server apparatus 2 may recognize that the user continues pressing the scroll button. Accordingly, the server apparatus 2 outputs screen information resulting from continuous scrolling.

BRIEF SUMMARY OF THE INVENTION

According to an embodiment of the present invention, a client apparatus which transmits a service request to a server apparatus via a network, the client apparatus comprises:

an input event detector configured to detect input events;

an information generator configured to generate an item of information integrating items of information of the input events detected by the input event detector; and a transmission unit configured to transmit the item of information to the server apparatus.

According to another embodiment of the present invention, a server apparatus which transmits screen information to a client apparatus in response to a service request transmitted from the client apparatus via a network, the server apparatus comprises:

a reception unit configured to receive information transmitted from the client apparatus; and a separating unit configured to separate the information received by the reception unit into items of information of input events.

According to another embodiment of the present invention, a server based computing system which includes a client apparatus and a server apparatus, the client apparatus transmitting a service request to the server apparatus via a network, the server apparatus generating screen information in response to the service request, the client apparatus comprises:

an input event detector configured to detect input events;

an information generator configured to generate an item of information integrating items of information of the input events detected by the input event detector; and a transmission unit configured to transmit the item of information to the server apparatus, the server apparatus comprises:

a reception unit configured to receive information transmitted from the transmission unit; and a separating unit configured to separate the information received by the reception unit into items of information of input events; and an event execution unit configured to execute processing corresponding to the input events based on the items of information of the input events.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of the present invention will be outlined first.

A thin client system according to the present embodiment includes a server apparatus which executes various application programs; a client apparatus which sends input information to the server apparatus in response to operation by a user, receives screen information from the server apparatus, and displays the screen information on a screen; and a network for data communication between the server apparatus and the client apparatus.

The server apparatus and the client apparatus respectively include communication units. The server apparatus executes a server program. The client apparatus executes a thin client viewer program. By means of the processing based on the above programs, the server apparatus and the client apparatus perform data communication via the network.

The client apparatus detects an operation (input event) performed by a user with an input device such as a keyboard or a mouse. The client apparatus sends information (input event information) corresponding to the input event to the server apparatus. The server apparatus receives the input event information sent from the client apparatus via the network. The server apparatus executes an application program corresponding to the received input information and generates display data. The generated display data is sent to the client apparatus. The client apparatus receives the display data sent from the server apparatus and displays the display data on an output device such as a display screen.

When interrelated input events occur in succession within a predetermined time period, the client apparatus according to the present embodiment integrates information of the input events into a single communication packet and transmits the communication packet to the server apparatus.

Furthermore, the client apparatus measures a period of time in which the interrelated input events occur, and determines the predetermined time period based on a mean value of the measured period.

When a communication packet sent from the client apparatus is a packet formed by integration of information of plural input events, the server apparatus according to the present embodiment separates the packet into the information of the input events. Then, the server apparatus executes processing corresponding to the respective input events.

Hereinafter, the present embodiment will be described in detail with reference to the accompanying drawings.

Figure 1:
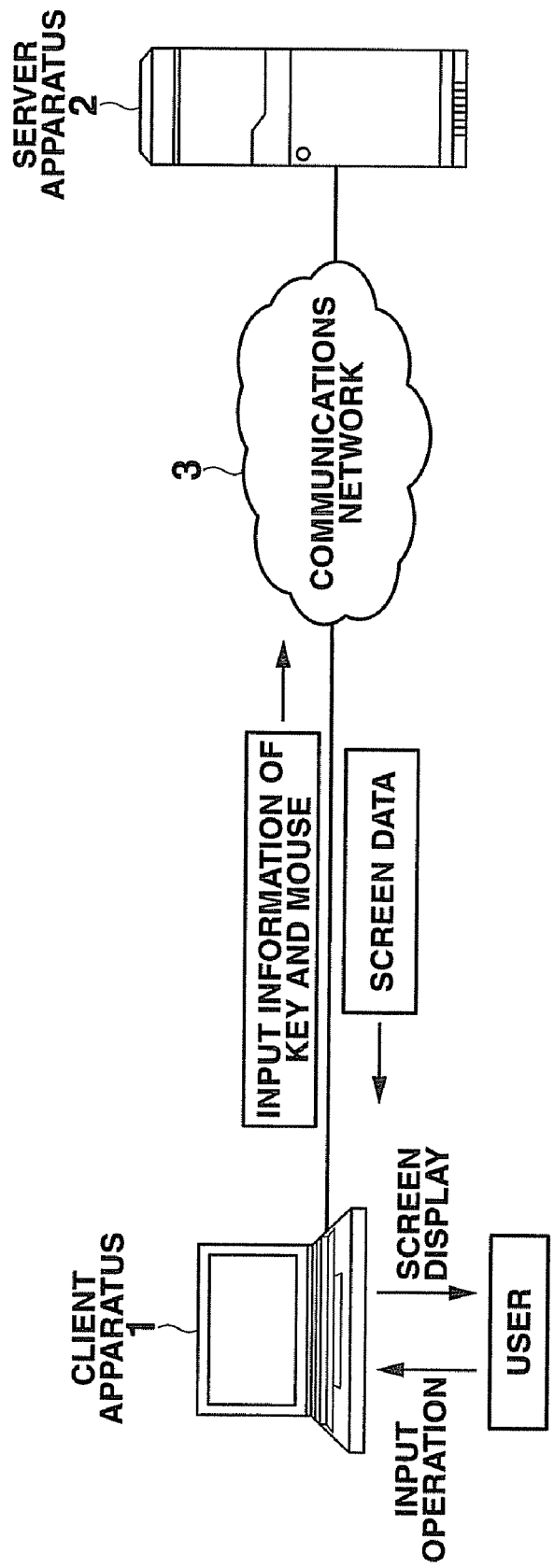
FIG. 1 is a schematic diagram for explaining a thin client system.
Figure 2A:
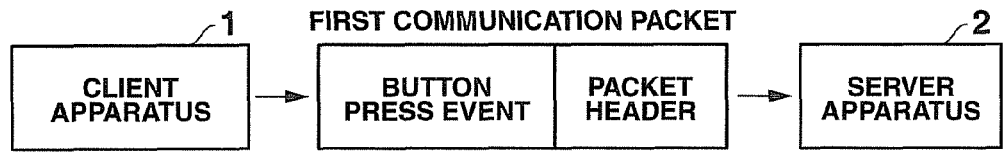
FIGS. 2A and 2B are views showing communication packets transmitted when a user clicks a mouse button of the client apparatus 1.
Figure 2B:
Figure 3:
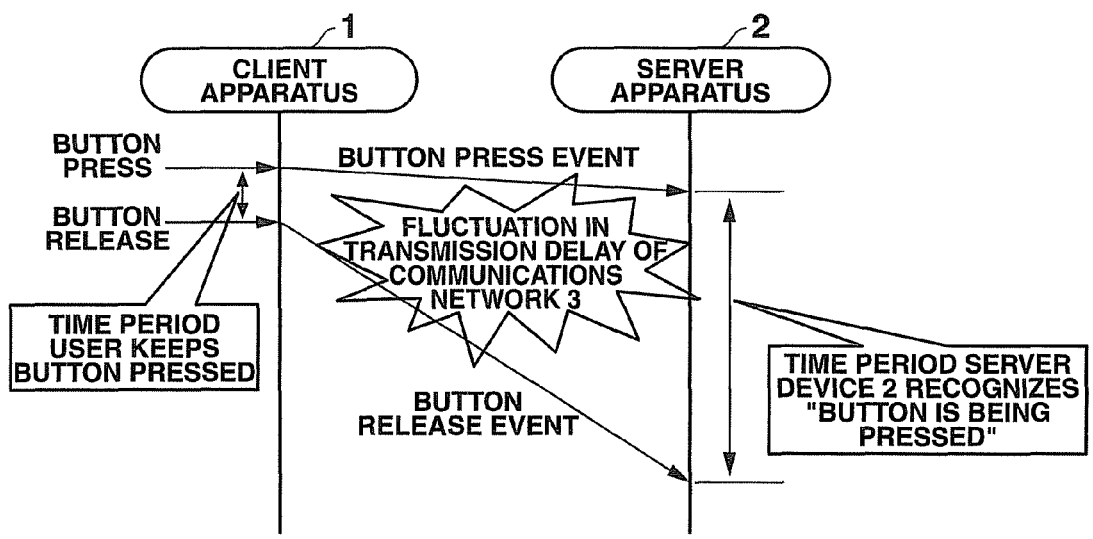
FIG. 3 is a view showing an example of a sudden fluctuation in a transmission delay time.
Figure 4:
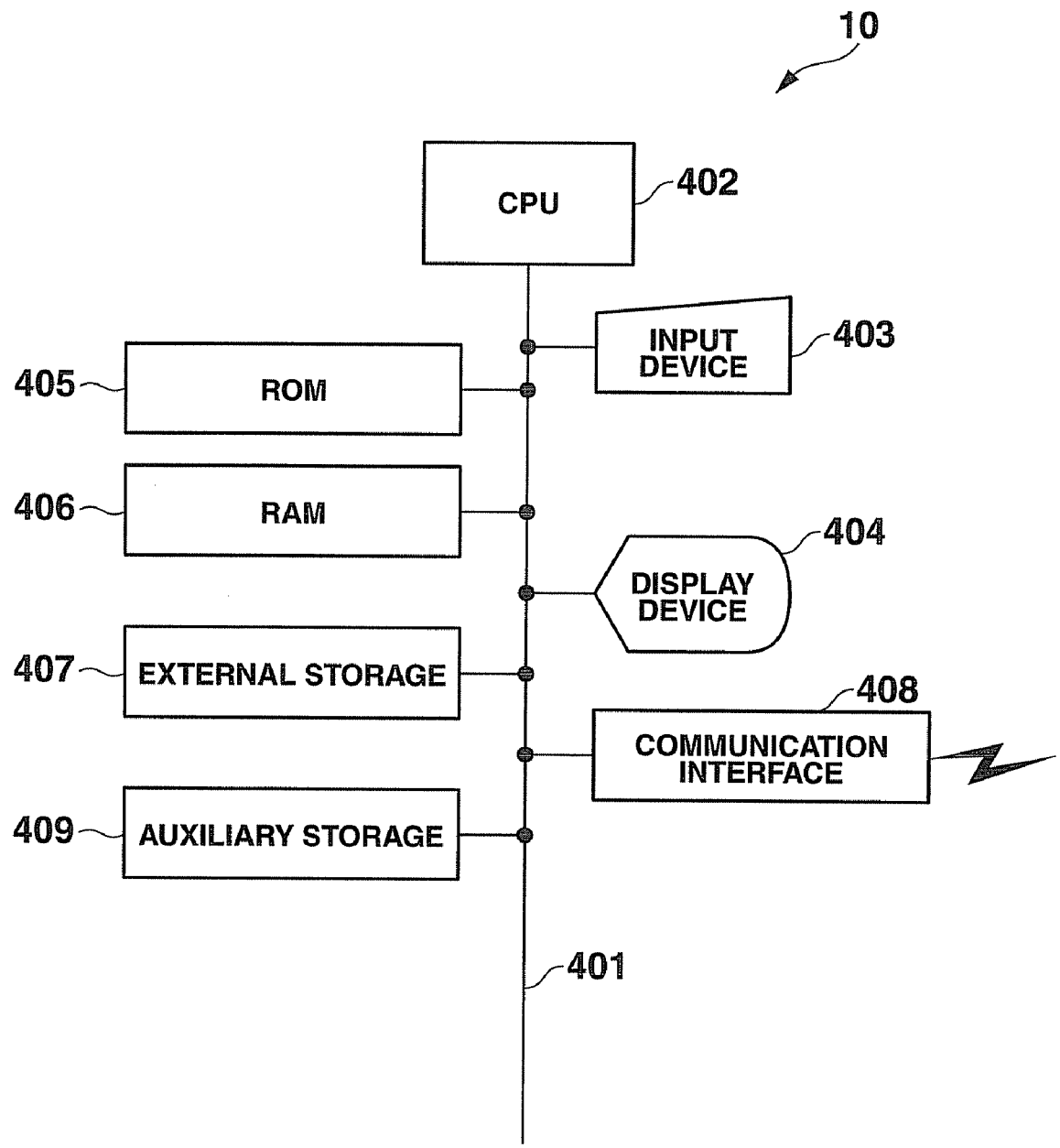
FIG. 4 is a schematic diagram of a hardware configuration of a client apparatus 10.

FIG. 4 is a schematic diagram of a hardware configuration of a client apparatus 10.

The client apparatus 10 includes a central processing unit (CPU) 402, an input device 403, a display device 404, a read only memory (ROM) 405, a random access memory (RAM) 406, an external storage 407, a communication interface 408, and an auxiliary storage 409. The components of the client apparatus 10 are interconnected via a bus 401. The CPU 402 controls operations of the components. The input device 403 is equipped with a keyboard, a mouse or the like and is operated to input various data and signals. The display device 404 displays an image and other information. The ROM 405 stores programs to execute various processing and a control program to control the components of the client apparatus 10. The external storage 407 stores an image or other information. The communication interface 408 is an interface for connection to a network such as a wireless local area network (wireless LAN) or a mobile telephone network. The auxiliary storage 409 temporarily stores input event information entered by means of the input device 403.

Figure 5:
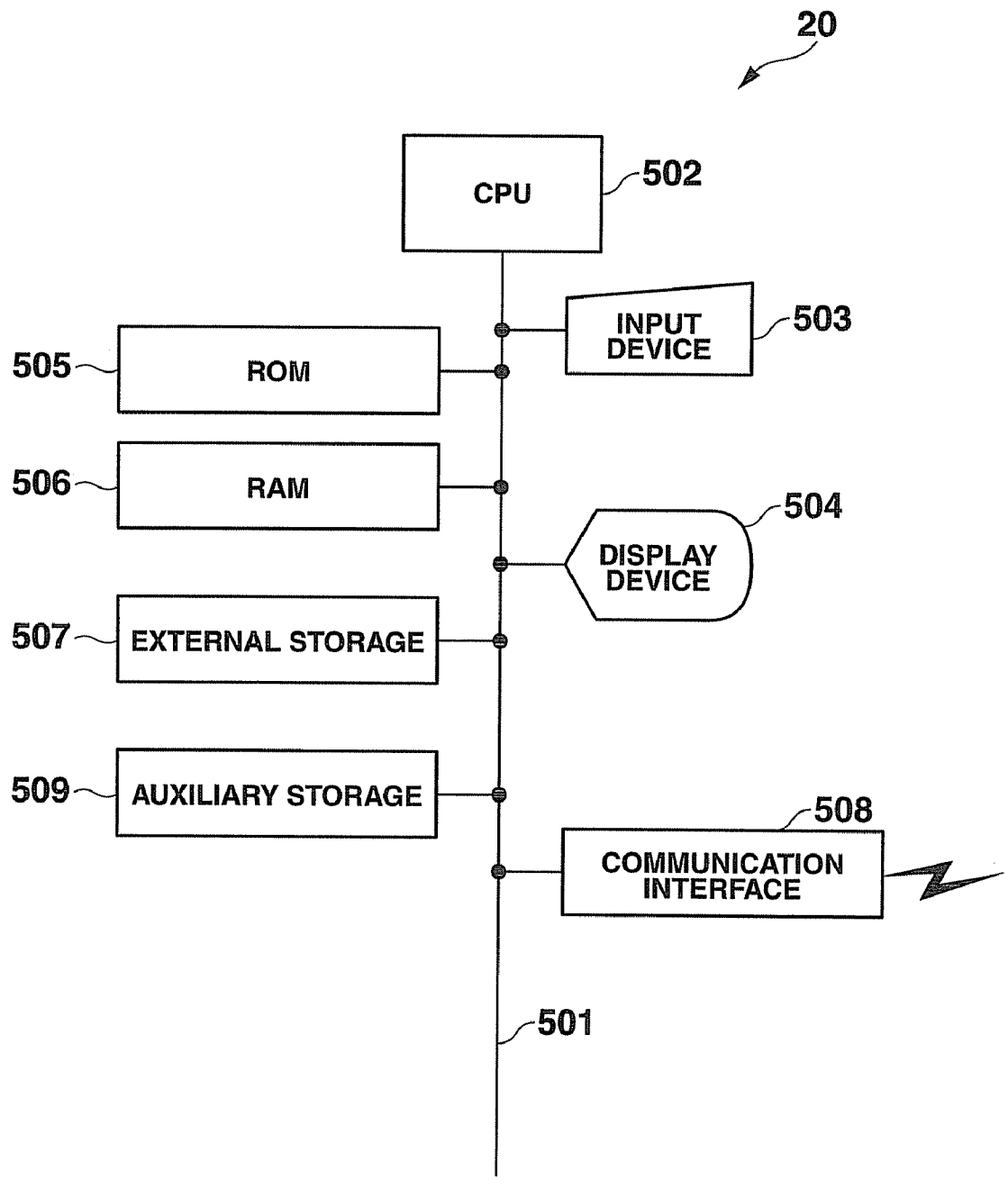
FIG. 5 is a schematic diagram of a hardware configuration of a server apparatus 20.

FIG. 5 is a schematic diagram of a hardware configuration of a server apparatus 20.

The server apparatus 20 includes a CPU 502, an input device 503, a display device 504, a ROM 505, a RAM 506, an external storage 507, a communication interface 508, and an auxiliary storage 509. The components of the server apparatus 20 are interconnected via a bus 501. The CPU 502 controls operations of the components. The input device 503 is equipped with a keyboard, a mouse or the like and is operated to input various data and signals. The display device 504 displays an image and other information. The ROM 505 stores programs to execute various processing and a control program to control the components of the server apparatus 20. The external storage 507 stores an image or other information. The communication interface 508 is an interface for connection to a network such as a wireless LAN or a mobile telephone network. The auxiliary storage 509 temporarily stores a communication packet sent from the client apparatus 10 and input event information contained in the communication packet.

Subsequently, operation examples of the client apparatus 10 and the server apparatus 20 in the server-based computing system configured as described above will be explained.

Figure 6:
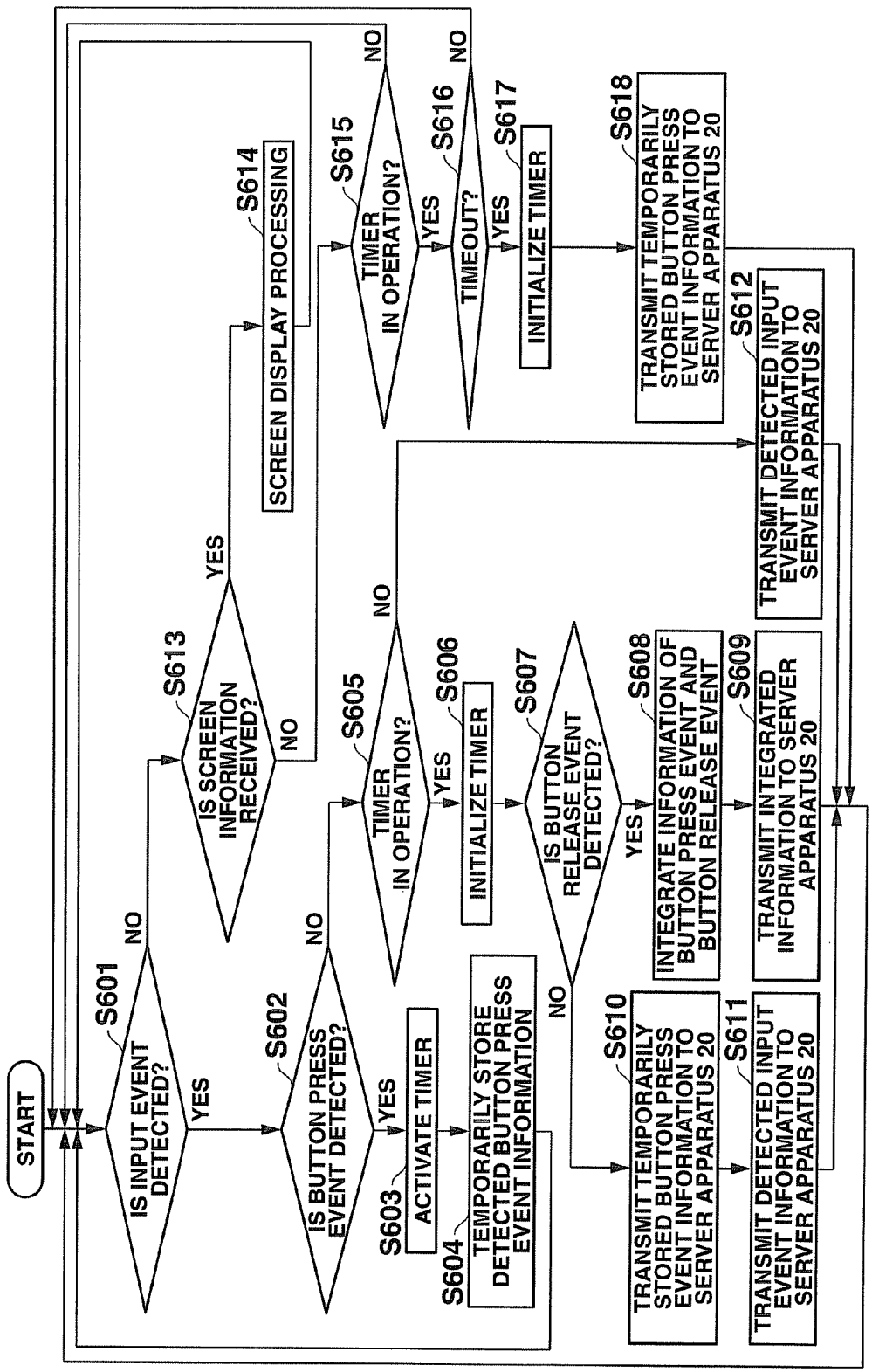
FIG. 6 is a flowchart of thin client viewer processing executed in the client apparatus 10.

FIG. 6 is a flowchart of thin client viewer processing executed in the client apparatus 10.

First, the CPU 402 detects operation (input event) of the keyboard or the mouse by the user (step S601). When the CPU 402 detects an input event ("Y" in step S601), the CPU 402 determines whether or not the detected input event is a press of the mouse button by the user (button press event) (step S602).

When it is determined that the detected input event is the button press event ("Y" in step S602), the CPU 402 activates a timer to start time measurement (step S603). The CPU 402 stores information of the detected button press event in the auxiliary storage 409 for temporary storage (step S604). The CPU 402 refers to the stored event information in steps S608, S610 and S618, as described later. Thereafter, the flow returns to step S601 to wait for the subsequent input event or reception of screen information.

When the detected input event is not the button press event ("N" in step S602), the CPU 402 determines whether or not the timer is in operation (step S605). When it is determined that the timer is in operation ("Y" in step S605), the CPU 402 initializes the timer and terminates the time measurement (step S606). The CPU 402 determines whether or not the detected input event is a release of the mouse button (button release event) (step S607).

When it is determined that the detected input event is the button release event ("Y" in step S607), the CPU 402 integrates the button press event information stored in the auxiliary storage 409 in step S604 and the button release event information detected in step S607 into a single communication packet (integrated packet) (step S608). The CPU 402 sends the integrated packet to the server apparatus 20 through the communication interface 408 (step S609). Thereafter, the flow returns to step S601 to wait for the subsequent input event or reception of screen information.

Figure 7:
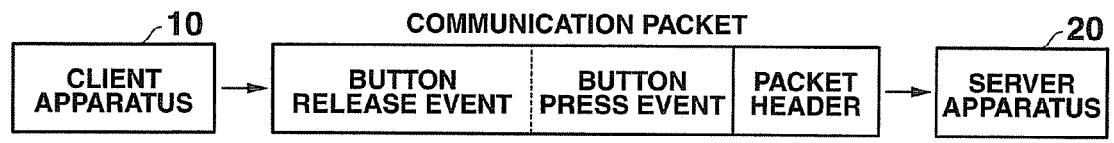
FIG. 7 is a view showing an example of an integrated packet formed by integration of information of two input events.
Figure 8:
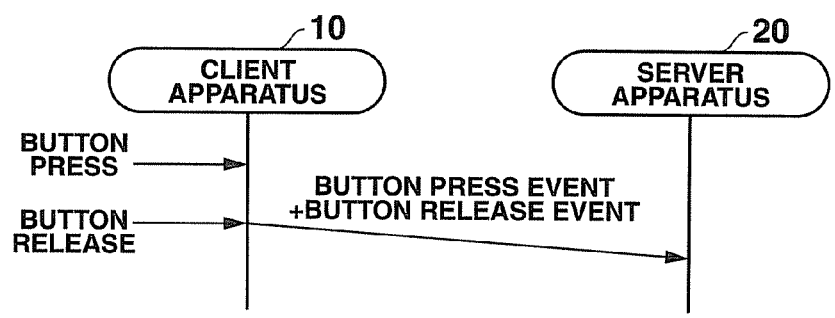
FIG. 8 is a view showing an example of transmission and reception of the integrated packet corresponding to a mouse click.

FIG. 7 is a view showing an example of the integrated packet which is formed by integration of the information of the two input events. FIG. 8 is a view showing an example of transmission and reception of the integrated packet corresponding to the mouse click.

When the user clicks the mouse button, two different input events occur, i.e., the button press event and the button release event. The items of information of the two input events are integrated into a single integrated packet. As shown in FIG. 7, the integrated packet contains a packet header, button press event information, and button release event information. The packet header indicates a type of the packet. That is, the header indicates whether or not the packet is an integrated packet. The integrated packet is sent from the client apparatus 10 to the server apparatus 20 as shown in FIG. 8.

On the other hand, when it is determined that the detected input event is not the button release event, namely, when it is determined that the detected input event is neither the button press event nor the button release event ("N" in step S607), the CPU 402 sends merely the button press event information, which is temporarily stored in the auxiliary storage 409, to the server apparatus 20 in the form of a communication packet (step S610). Subsequently, the CPU 402 sends information of the detected input event (other than the button press event and the button release event) to the server apparatus 20 in the form of a communication packet (step S611). Thereafter, the flow returns to step S601 to wait for the subsequent input event or reception of screen information.

When it is determined that the timer is not in operation ("N" in step S605), information of the detected input event (other than a button press event) is sent to the server apparatus 20 in the form of a communication packet (step S612). The flow returns to step S601 to wait for the subsequent input event or reception of screen information.

When any input event, which is entered by means of the keyboard or the mouse, is not detected ("N" in step S601), the CPU 420 determines whether or not screen information sent from the server apparatus 20 is received through the communication interface 408 (step S613).

When the CPU 402 determines that the screen information is received ("Y" in step S613), the CPU 402 executes display processing based on the received screen information (step S614). That is, the CPU 402 causes the display device 404 to display a screen according to the received screen information. Thereafter, the flow returns to step S601.

On the other hand, when it is determined that the screen information is not received, that is, when neither any input event nor the reception of screen information is detected ("N" in step S613), the CPU 402 determines whether or not the timer is in operation (step S615).

When it is determined that the timer is not in operation ("N" in step S615), the flow returns to step S601 to wait for the subsequent input event or reception of screen information.

When it is determined that the timer is in operation ("Y" in step S615), the CPU 402 determines whether or not timeout occurs. Namely, the CPU 402 determines whether or not a predetermined timeout period T has elapsed from the start of the time measurement (step S616). When it is determined that the timeout does not occur ("N" in step S616), the flow returns to step S601 to wait for the subsequent input event or reception of screen information. When it is determined that the timeout occurs ("Y" in step S616), the CPU 402 initializes the timer and terminates the time measurement (step S617). In the case in which the button press event information is being temporarily stored in the auxiliary storage 409, the CPU 402 sends the button press event information to the server apparatus 20 in the form of a communication packet (step S618). Thereafter, the flow returns to step S601 to wait for the subsequent input event or reception of screen information.

The aforementioned thin client viewer processing includes timeout determination processing for determining whether or not the timeout period T has elapsed (step S616) and processing to be executed when an input event other than a button release event is detected (steps S610 and S611). Consequently, the present embodiment can cope with such an operation as the user keeps the mouse button depressed, e.g., mouse drag.

In the above thin client viewer processing, when a button press event is followed by another input event, the CPU 402 initializes the timer and terminates the time measurement operation (step S606). However, the processing of step S606 may not be executed and the time measurement may be terminated when the detection of a button release event follows detection of a button press event ("Y" in step S607). When the button press event is followed by an input event other than the button press event and the button release event (e.g., key operation on the keyboard) ("N" in step S607), the processing of step S610 may not be executed and the information of the detected input event and the input event other than the button release event may be transmitted. When the button release event occurs before the timeout of the timer, which is started in response to occurrence of the button press event, information of the button press event and information of the button release event are integrated into a single integrated packet and sent to the server apparatus 20 even when another input event occurs between the button press event and the button release event.

As described above, the client apparatus 10 according to the present embodiment integrates the button press event information and the button release event information into a single communication packet and transmits the communication packet to the server apparatus 20 when the button press event and the button release event occur within the timeout period T. Namely, information of interrelated input events, which occur within a predetermined time period, is integrated to be sent to the server apparatus 20 in the single communication packet. It becomes possible to prevent the server apparatus 20 from erroneously recognizing relation among the input events due to fluctuation of the transmission delay time. That is, information of two different input events, which occur in succession, are integrated and transported in a single communication packet; accordingly, it is possible to prevent the server apparatus 20 from performing operation which do not correspond to operation by the user.

In the above-described thin client viewer processing, mouse button clicking is explained as an example. However, the input event is not limited to the click operation. The above thin client viewer processing can be applicable to any combination of interrelated input events.

In the above description, information of two different input events which occur in succession are integrated and transmitted in the form of a single communication packet. However, information of three or more different input events may be integrated and transmitted in the form of a single communication packet.

The timeout period T may be constant, or may be varied according to timeout period setting processing to be hereinafter described.

As described above, in the case where the detection of a button press event is not followed by detection of another input event, it is after the elapse of the timeout period T that the button press event information is sent to the server apparatus 20 (steps S616 to S618). That is, the transmission of the button press event information delays for the timeout period T.

Figure 9:
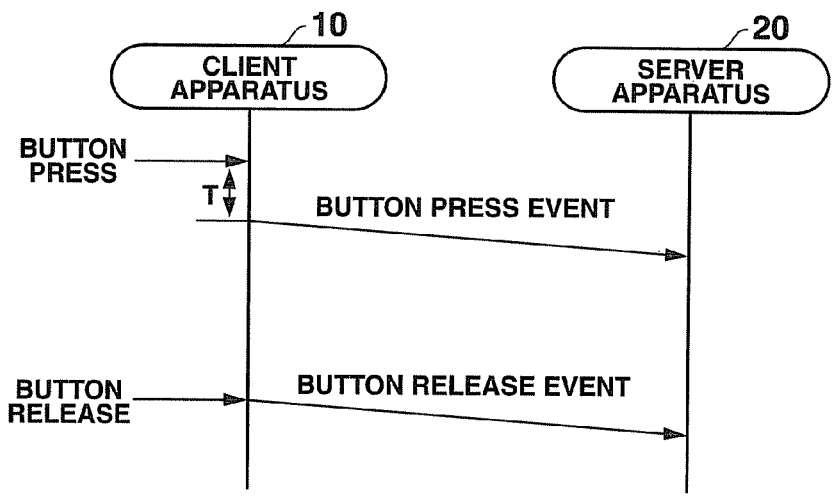
FIG. 9 is a view showing an example of transmission and reception of a communication packet corresponding to a longer press of the mouse button.

FIG. 9 is a view showing an example of transmission and reception of a communication packet corresponding to a longer press of the mouse button.

In the case where the mouse button keeps being depressed down for a long time, any input event is not detected during the timeout period T, which starts from when a button press event is detected and the timer is activated. As shown in FIG. 9, it is after the elapse of the timeout period T that the client apparatus 10 sends the button press event information toward the server apparatus 20. Therefore, the server apparatus 20 recognizes shorter time period than the actual time period during which the mouse button keeps being depressed. Therefore, the server apparatus 20 performs operation which is apart from intention of the user. It is preferable that the value of the timeout period T is as small as possible. However, when the value of the timeout period T is too small, even when the user clicks the mouse button, the timeout may occur before the button release event is detected. Moreover, the processing of integrating the button press event information and the button release event information will not be performed.

The timeout period setting processing to be described below allows the value of the timeout period T to be set as small as possible insofar as the timeout does not occur between the button release event and the a button release event.

In the timeout period setting processing, an operation period in which the mouse button is clicked is measured. That is, the time between the button press event and the button release event is measured. The value of the timeout period T is set on the basis of a mean operation period for clicking.

The operation period, in which the user clicks the mouse button, varies according to habit with the user or level of skill in mouse click operation. Setting of the timeout period T takes account of the mean operation period of mouse clicking by the user. Thus, it is possible to set the optimum timeout period T for the user of the client apparatus 10.

Figure 10:
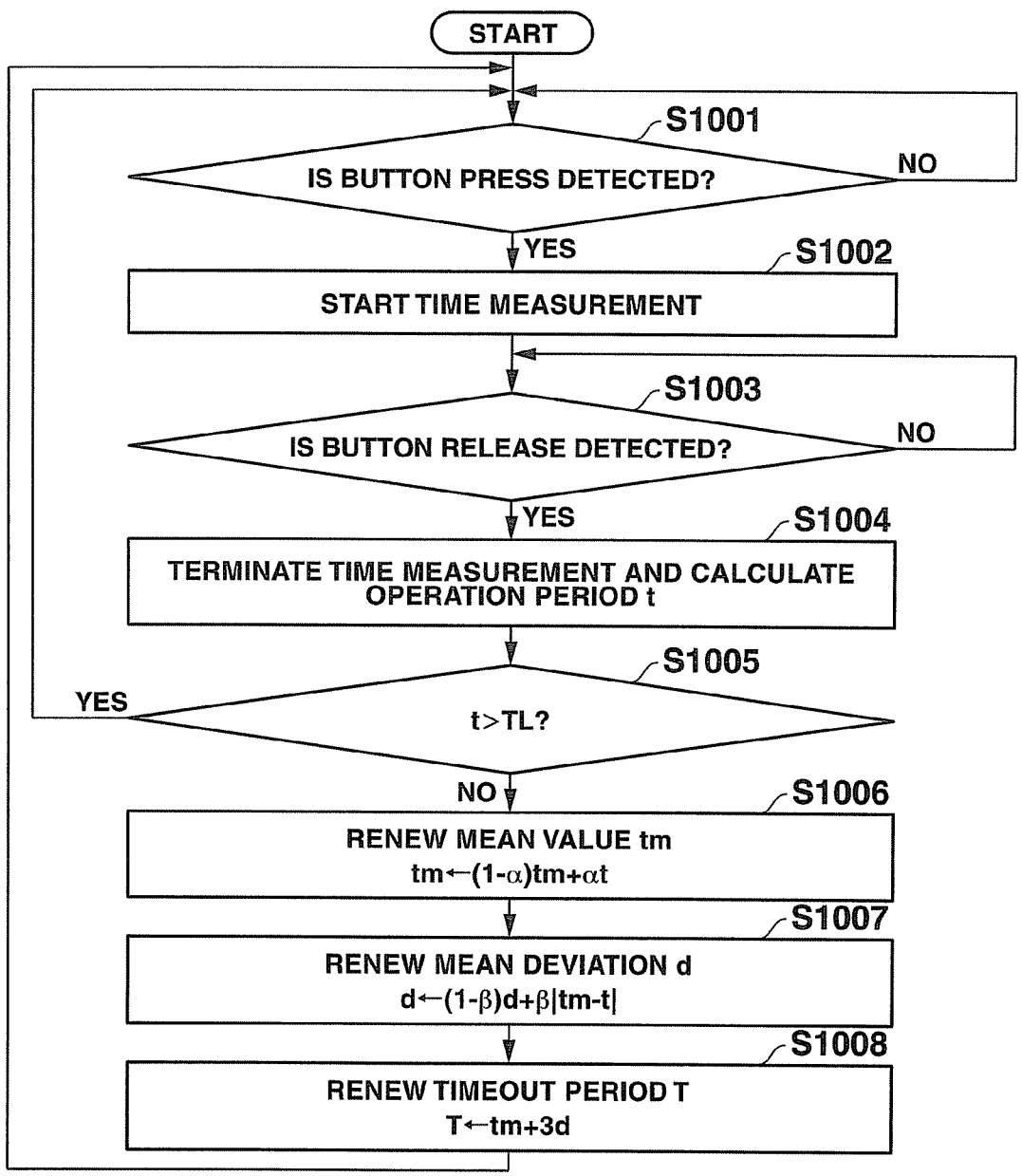
FIG. 10 is a flowchart of timeout period setting processing.

FIG. 10 is a flowchart of the timeout period setting processing. The flowchart of FIG. 10 may be always executed on background or in response to an instruction by user.

In the timeout period setting processing, every time the user operates the mouse button, an operation period t (a period of time from the detection of the button press event to the detection of the button release event) is measured. A mean operation time and a mean deviation of click operation time by the user are derived from the measured operation period t. The optimum timeout period T is set based on the derived mean operation period and the mean deviation.

Upon detecting a button press event ("Y" in step S1001), the CPU 402 starts time measurement operation (step S1002). When the button release event is detected ("Y" in step S1003), the CPU 402 terminates the time measurement operation and calculates the operation period t between the detection of the button press event and the detection of the button release event (step S1004).

The CPU 402 compares the calculated operation period t with a predetermined threshold value TL (step S1005). When the operation period t is larger than the threshold value TL ("Y" in step S1005), it is considered that the operation made by the user is not click operation but long depression of the mouse button. The flow then returns to step S1001. In the present case, the measured operation period t is deleted and is not used in setting the optimum timeout period T.

When the operation period t is equal to or smaller than the threshold value TL ("N" in step S1005), the CPU 402 renews a mean operation period (step S1006). The new mean operation period is derived from "$(1-\alpha)tm+\alpha t$", where the tm expresses the mean operation period calculated in the last execution of the timeout period setting processing. The $\alpha$ is an adjustment parameter. For example, setting the value of $\alpha$ as "$\alpha=0.1$" means that the measured operation period t is weighted by 1/10 and the mean operation period tm, which is calculated on the basis of the operation periods previously measured, is weighted by 9/10. The CPU 402 stores the newly calculated mean operation period in the auxiliary storage 409 (or the RAM 406) as the mean operation period tm.

The CPU 402 renews a mean deviation of the operation period for mouse clicking (step S1007). The new mean deviation is derived from "$(1-\beta)d+\beta|tm-t|$", where the d expresses the mean deviation, which is calculated in the last execution of the timeout period setting processing. The $\beta$ is an adjustment parameter which works similarly to the $\alpha$. The CPU 402 stores the newly calculated mean deviation in the auxiliary storage 409 (or the RAM 406) as the mean deviation d.

The CPU 402 calculates the timeout period T based on the mean operation period tm and the mean deviation d newly calculated in steps S1006 and S1007 (step S1008). The timeout period T is expressed by the expression "$tm+3d$". Then, the flow returns to step S1001.

The tm and the d calculated as above are not properly (statistically) the mean value and the mean deviation of the operation period t. However, the above expressions are effective because the above calculations are simple, and precise calculations are not needed here.

According to the statistical theory, in the case where a population conforms to a normal distribution, a value of a sample rarely deviates from the mean value by three times or more of a normal deviation. Consequently, "(operation period)+(treble period of mean deviation)" of mouse clicking is set as the timeout period T. To simplify the calculations and to decrease load on operational equipment, not the normal deviation but the mean deviation is utilized in the above calculations. However, the timeout period T may be obtained as follows. That is, the mean operation period and the normal deviation (or the mean deviation) of the operation period are derived from the measurement results of the immediately previous measurements. Thereafter, the timeout period may be calculated based on the derived mean operation period and the normal deviation (or the mean deviation).

The information sent from the client apparatus 10 in step S609, S611, S612, or S618 of FIG. 6 is received by the server apparatus 20. The server apparatus 20 executes processing according to the received information. Hereinafter, the processing executed by the server apparatus 20 will be described.

Figure 11:
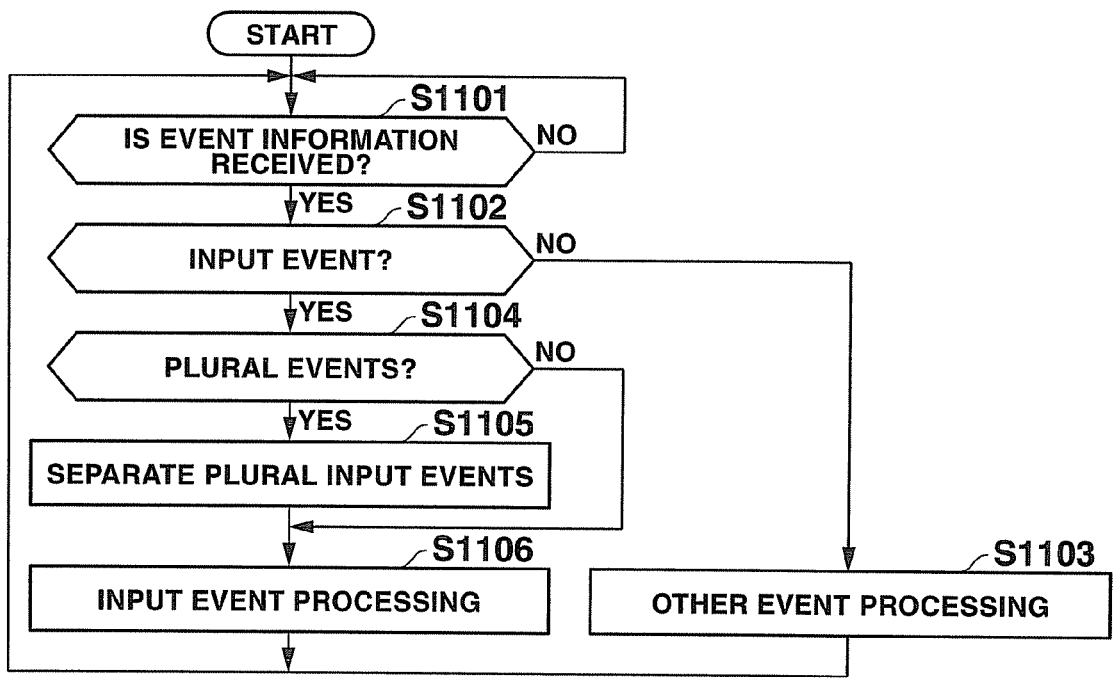
FIG. 11 is a flowchart of processing executed in the server apparatus 20.

FIG. 11 is a flowchart of the processing executed by the server apparatus 20.

First, the CPU 502 of the server apparatus 20 determines whether or not a communication packet containing event information and transmitted from the client apparatus 10 is received (step S1101). When it is determined that the communication packet is received ("Yes" in step S1101), it is determined whether or not the event information is input event information (step S1102).

When it is determined that the event information contained in the received communication packet is not the input event information ("No" in step S1102), then the CPU 502 executes processing corresponding to the received event information (step S1103). When the processing corresponding to the received event information produces screen information, the CPU 502 transmits the screen information to the client apparatus 10. Thereafter, the flow returns to step S1101.

On the other hand, when the event information contained in the received communication packet is input event information ("Yes" in step 1102), the CPU 502 determines based on the packet header whether or not the received communication packet is an integrated packet which includes the information of plural input events (step S1104).

When it is determined that the received packet is an integrated packet ("Yes" in step S1104), the CPU 502 separates the integrated information into information of the plural input events, and reproduces original information of respective input events (step S1105). The CPU 502 executes processing corresponding to the reproduced input event information (step S1106). When the processing corresponding to the reproduced event information creates screen information, the CPU 502 transmits the screen information to the client apparatus 10. Thereafter, the flow returns to step S1101.

In the present embodiment, the client apparatus 10 transmits information to the server apparatus 20 in a unit of packet. However, the unit of information transmission may not be the packet, provided that information of the interrelated input events can be integrally transmitted.

The embodiments according to the present invention are described with reference to the drawings. The embodiments of the present invention can be realized by hardware, or firmware or software of a digital signal processor (DSP) board or a CPU board, as a function of the client apparatus 10 or the server apparatus 20.

The server apparatus and the client apparatus to which the present invention is applied are not limited to the above embodiments. As long as function of the embodiments can be executed, the server apparatus and the client apparatus may be units of devices, systems or integrated devices including a plurality of devices, and systems in which processing is performed via a network such as a LAN and a wide area network (WAN).

A system including components, which are interconnected via a bus, such as a CPU, a memory of a ROM and a RAM, an input device, an output device, an external storage device, a media drive device, a network connecting device, may realize the present invention. Namely, the present invention can be realized as follows, that is, the client apparatus 10 and the server apparatus 20 are provided with memory units, such as the ROM, the RAM, the external storage device, or the portable storage medium. The memory units store programs of software realizing the aforementioned embodiments. Computers of the client apparatus 10 and the server apparatus 20 read and execute the program.

In such a case, the programs itself, which are read from the memory units, achieve the novel functions of the present invention. Moreover, the memory units storing the program may be components of the present invention.

As the portable recording medium for providing the program, the following mediums may be utilized, e.g., a flexible disk, a hard disk, an optical disk, an optical magnetic disk, a CD-ROM, a CD-R, a DVD-ROM, a DVD-RAM, magnetic tape, a nonvolatile memory card, a ROM card, and a variety of storage media which stores the program via a network connecting device (i.e., a communication line) for e-mail or PC communication, and so on.

The functions of the foregoing embodiments are realized as a result of the execution of the programs which are expanded on the memory unit by the computer (information processor). In addition, an operation system or the like running on the computer executes a part or a whole of actual processing based on the instructions of the program, and the processing realizes the functions of the above-described embodiments.

Further, the following processing can realize the functions of the above-described embodiments. Namely, the program read from the portable recording medium or the program (program data) provided by a program (program data) provider is written into the memory. The memory is attached to a function enhancement board which is inserted into the computer, or a function enhancement unit which is connected to the computer. Thereafter, the CPU or the like, which is implemented on the function enhancement board or the function enhancement unit, executes the part or the whole of the actual processing under the control of the instructions of the program.

Namely, the present invention is not limited to the above described embodiments, and various configurations or forms may be made without departing from the spirit or scope of the present invention.

What is claimed is:

1. A client apparatus configured to transmit a service request to a server, receive screen information corresponding to the service request from the server, and display the received screen information, the client apparatus comprising:
    a detector configured to detect an input event in accordance with an operation on an input device;
    a first determination unit configured to determine whether the input event detected by the detector is a first event;
    a second determination unit configured to store the input event and determine whether a subsequent event detected by the detector after detection of the first event is a second event associated with the first event if the first determination unit determines that the input event is the first event;
    a first transmitter configured to transmit the input event to the server if the first determination unit determines that the input event is not the first event, and transmit an integrated event comprising the stored event and the second event to the server if the second determination unit determines that the subsequent event is the second event; and
    a second transmitter configured to output the stored event and transmit the subsequent event to the serve if the second determination unit determines that the subsequent event is not the second event.

2. The client apparatus according to claim 1, further comprising:
    a third transmitter configured to transmit the stored event to the server if no event is detected during a predetermined period of time after the second determination unit stores the input event.

3. The client apparatus according to claim 1, wherein the first event comprises a press event of the input device and the second event comprises a release event of the input device.

4. A computer-readable, non-transitory storage medium having stored thereon a computer program which is executable by a computer of a client apparatus configured to transmit a service request to a server, receive screen information corresponding to the service request from the server, and display the received screen information, the computer program controlling the computer to execute functions of:
    detecting an input event in accordance with an operation of an input device;
    determining whether the detected event is a first event;
    storing the input event and determining whether a subsequent detected event is a second event associated with the first event if it is determined that the input event is the first event;
    transmitting the input event to the server if it is determined that the input event is not the first event, and transmitting an integrated event comprising the stored event and the second event to the server if it is determined that the subsequent detected event is the second event; and
    outputting the stored event and transmitting the subsequent event to the serve if the second determination unit determines that the subsequent event is not the second event.

5. A method of controlling a client apparatus configured to transmit a service request to a server, receive screen information corresponding to the service request from the server, and display the received screen information, the computer method comprising:
    detecting an input event in accordance with an operation of an input device;
    determining whether the detected event is a first event;
    storing the input event and determining whether a subsequent detected event is a second event associated with the first event if it is determined that the input event is the first event;
    transmitting the input event to the server if it is determined that the input event is not the first event, and transmitting an integrated event comprising the stored event and the second event to the server if it is determined that the subsequent detected event is the second event; and
    outputting the stored event and transmitting the subsequent event to the serve if the second determination unit determines that the subsequent event is not the second event.

6. A client apparatus configured to transmit an input event generated in accordance with a user operation to a server, receive screen information from the server, and display the received screen information, the client apparatus comprising:
    a detector configured to detect the input event;
    an information generating unit configured to determine whether the detector detects a first input event and a second input event within a predetermined period of time, the second input event being associated with the first input event, and generate an integrated event comprising the first input event and the second input event if the detector detects the first input event and the second input event within the predetermined period of time;
    a transmitter configured to transmit the integrated event to the server if the detector detects the first input event and the second input event within the predetermined period of time, and the input event to the server if the detector does not detect the first input event and the second input event within the predetermined period of time; and
    a second transmitter configured to output the stored event and transmit the subsequent event to the serve if the second determination unit determines that the subsequent event is not the second event.

* * * * *